United States Patent Office 3,122,578
Patented Feb. 25, 1964

3,122,578
COMPLEXES OF TETRACYCLINE ANTIBIOTICS
AND PREPARATION OF SAME
Edward Grant Remmers, Ridgewood, N.J., and William Charles Barringer, Pearl River, and Lawrence Ritter, Suffern, N.Y., assignors to American Cyanamid Company, New York, N.Y., a corporation of Maine
No Drawing. Filed Feb. 21, 1962, Ser. No. 174,714
14 Claims. (Cl. 260—448)

This invention relates to stable complexes formed from broad spectrum tetracycline antibiotics, aluminum, and bis-(1-carboxy-1-hydroxyethyl)phosphinic acid; and to the stable addition complexes of calcium therewith. The invention includes the new tetracycline antibiotic complexes, the methods of making these complexes, and the oral therapeutic preparations containing the same.

The tetracycline antibiotics involved in the present invention include tetracycline itself, 7-chlorotetracycline,
5-hydroxytetracycline,
6-demethyltetracycline,
7-chloro-6-demethyltetracycline,
6-deoxytetracycline,
6-demethyl-6-deoxytetracycline, and various derivatives of these such as the following tetracycline compounds:

7-bromo-6-demethyl-6-deoxytetracycline,
7-chloro-6-demethyl-6-deoxytetracycline,
7-bromo-6-deoxytetracycline,
7-chloro-6-deoxytetracycline,
7-chloro-5-hydroxy-6-deoxytetracycline,
7-bromo-5-hydroxy-6-deoxytetracycline,
and 5-hydroxy-6-deoxytetracycline.

The expression "tetracycline antibiotic" as used throughout the specification and claims is intended to embrace any of the foregoing tetracycline compounds. It is to be understood that those tetracyclines which are commercial or potentially commercial drugs such as 7-chlorotetracycline, tetracycline, 5-hydroxytetracycline, 6-demethyltetracycline, and 7-chloro-6-demethyltetracycline are especially preferred because of their ready availability and demonstrated clinical usefulness.

The use of the tetracycline antibiotics administered orally presents some problems where it is desired to have the antibiotic penetrate the blood stream, as in many cases there is considerable loss through poor absorption of antibiotic and thus only a portion appears in the blood. In the past, various attempts have been made to increase the blood levels obtained by oral feeding of tetracycline antibiotics with various substances which have been generally referred to in the art as adjuvants.

It has now been found that the tetracycline antibiotics form unusually stable complexes with aluminum cations and bis-(1-carboxy - 1 - hydroxyethyl)phosphinic acid. These complexes are not of a simple nature and may contain from 1 to 4 moles of aluminum per mole of tetracycline antibiotic, and from 1 to 12 moles of bis-(1-carboxy-1-hydroxyethyl)phosphinic acid per mole of tetracycline antibiotic. The number of moles of acid is preferably at least as great as the number of moles of aluminum cations. These complexes additionally have the beneficial characteristic of forming therapeutically suitable complexes with calcium cations. The calcium cations add on to the antibiotic-aluminum-acid complex to form four-component complexes which are particularly stable in solution. Varying proportions of calcium cations may be added to form the stable four-component complexes. For example, these complexes may contain from 1 to 4 moles of aluminum per mole of tetracycline antibiotic, from 0.1 to 3 moles of calcium per mole of the antibiotic, and from 1 to 12 moles of bis-(1-carboxy-1-hydroxyethyl)phosphinic acid per mole of the antibiotic. Again, the number of moles of acid is preferably at least as great as the number of moles of aluminum cations.

The preparation and properties of bis-(1-carboxy-1-hydroxyethyl)phosphinic acid have been fully set forth in U.S. Patents No. 2,845,454 and No. 2,953,584 to Buckler and Wystrach. For convenience, the bis-(1-carboxy-1-hydroxyethyl)phosphinic acid has been designated by us as CHEPA and will be so referred to in the remainder of the specification.

The complexes of the present invention do not have sharp melting points but in general darken over a considerable temperature range, usually above 165° C. The exact characteristics of the complexes vary, depending upon the tetracycline antibiotic being employed, and also upon whether or not the complex formed with aluminum and CHEPA is further complexed with calcium. Variations in the molar ratios of the components cause variations in the apparent characteristics. The complexes exhibit the biological activity against microorganisms which is to be anticipated from their tetracycline antibiotic content, and gave a comparatively high blood level without irritation.

The unusual solubility and stability of the novel complexes of the present invention are clearly an advantage in the preparation of pharmaceutically desirable products such as elixirs, syrups, pediatric drops, sprays, infusions and the like. The novel complexes of the present invention have a solubility of from 30 mg. to 500 mg. or more per milliliter of water. In addition, the solutions are physically and biologically stable for long periods of time, retaining their clear color and their antibiotic potency for many months at room temperature. The pH of the aqueous solutions of the complexes of the present invention may be adjusted to anywhere within the range of from about 3.0 to 7.0, and some will remain in solution at a pH as high as 12. These novel complexes also form stable solutions or suspensions in organic solvents such as propylene glycol, polyethylene glycol, peanut oil, castor oil, and other organic solvents which are often used in the oral administration of pharmaceutical products. The reason for the greatly increased solubility of the novel complexes of the present invention over other forms of the tetracycline antiobiotics is not known. Their outward appearance and physiological behavior seem to be alike. The outstanding differences in solubility, however, indicate a difference in structure.

The novel complexes of the present invention may be most conveniently formed in aqueous solution, although they may also be formed in organic solvents or mixtures of organic solvents. The tetracycline antibiotic, the aluminum, and the CHEPA may be added in any form which will release the antibiotic, the aluminum ions, and the CHEPA ions for complex formation. It is preferred that the aluminum ions first react with the CHEPA ions and then the antibiotic be added to this product. When a four-component complex is desired, the complex forming cations of calcium may be added in the form of the oxide, hydroxide, or soluble salts. The pH of the solution may be adjusted either before, during, or after complex formation with sodium hydroxide or other alkali metal hydroxide, or with an alkaline earth metal hydroxide such as calcium hydroxide, or with an organic nitrogen base such as triethylamine, triethanolamine, piperazine, morpholine, or diethanolamine.

The complex may be used in the aqueous solution in which formed or it may be recovered from the solution in a number of different ways as will be apparent from the examples. The complex may be recovered by simple evaporation of the solvent preferably at reduced pressure and at low temperatures. Alternatively, the complex may be recovered by precipitation from the solution by altering the solvent system, as for instance, by the addition of a water soluble organic solvent to an aqueous solution which produces a system in which the complex is less soluble. If the complex is formed in high concentration, it may precipitate out upon standing. Since various methods of recovering the complex are available and as this is not a critical part of the invention, further elaboration is unnecessary.

The aluminum may be added as an alkoxide. Aluminum isopropoxide and aluminum ethoxide are particularly convenient. Other forms of aluminum such as aluminum citrate, aluminum nitrate, aluminum tartrate, aluminum chloride and aluminum sulfate may be used. The tetracycline antibiotic may be added as the free base, the hydrochloride, the hydrobromide, the nitrate, the sulfate, or as the sodium salt or other alkali metal salt, or as the calcium salt or other alkaline earth metal salt. Effectively, any form of aluminum which is ionizable and any form of the tetracycline antibiotics of the present invention which gives the ionizable form of the antibiotic may be used in preparing the present complexes. The formation of the complex, as is frequent in complex formation, may be a rather slow process and may require from a few minutes to several hours depending upon conditions. When desired, the components may be admixed in the proper proportion as a dry formulation to which water may be added in order to obtain the complex in aqueous solution.

The complexes of the present invention may be used for oral administration enclosed in hard or soft shell gelatin capsules or they may be incorporated with animal feeds. A dosage unit for oral administration in humans is most conveniently from about 250 mg. to 1500 mg. of the complex. Inert materials such as starch, sucrose, or magnesium stearate may be added if desired. A preferred composition consists of sufficient complex to give 150–250 mg. of the antibiotic equivalent in a soft gelatine capsule. If desired, the complexes may be granulated and administered as such or may be compressed into tablets.

In general, the methods of administering the complexes of the present invention do not depart from the conventional methods of administering tetracycline antibiotics. This is an advantage of the present invention and improved results are obtained without requiring any special technique of administration. The complexes of the present invention will be administered by the attending physician or veterinarian in accordance with the age and condition of the patient, the nature of the disease, and in view of the other considerations peculiar to the individual patient.

A more comprehensive understanding of the present invention may be obtained by reference to the following specific examples.

EXAMPLE 1

*Aluminum-CHEPA Complex (1:3)*

In 350 ml. of distilled water was suspended 78 g. of CHEPA and 20.4 g. of alumina isopropoxide and the suspension was stirred at room temperature for 24 hours. The resulting solution was filtered to remove all traces of insoluble material.

EXAMPLE 2

*Tetracycline-Aluminum-CHEPA (1:4:6.6)*

In 25 ml. of distilled water was suspended 5.2 g. of CHEPA and 2.49 g. of aluminum isopropoxide and the suspension was placed in a mechanical shaker at room temperature overnight. The resulting solution was filtered to remove all traces of insoluble material. To the filtrate was added 1.35 g. of tetracycline and this was stirred for 30 minutes until an essentially clear solution was obtained. The pH of this solution was adjusted to 5.0 with concentrated sodium hydroxide solution prior to filtering and lyophilization. The product was dried overnight in vacuo at 40° C. whereby there was obtained the tetracycline-aluminum-CHEPA complex.

EXAMPLE 3

*7-Chlorotetracycline-Aluminum-CHEPA (1:4:6.6)*

To 15 ml. of the aluminum-CHEPA complex solution prepared according to Example 1 was added 1.35 g. of 7-chlorotetracycline. The solution was stirred until clear, and the pH was then adjusted to 5.0 with concentrated sodium hydroxide solution. The resulting solution was filtered and lyophilized. The product was dried overnight in vacuo at 40° C. whereby there was obtained the 7-chlorotetracycline-aluminum-CHEPA complex.

EXAMPLE 4

*6-Demethyltetracycline-Aluminum-CHEPA (1:4:6.6)*

In 25 ml. of distilled water was suspended 3.75 g. of CHEPA and 1.8 g. of aluminum isopropoxide and the suspension was placed in a mechanical shaker at room temperature overnight. The resulting solution was filtered to remove all traces of insoluble material. To the filtrate was added 1.0 g. of 6-demethyltetracycline and this was stirred for 30 minutes until an essentially clear solution was obtained. The pH of this solution was adjusted to 5.0 with concentrated sodium hydroxide solution prior to filtering and lyophilization. The product was dried overnight in vacuo at 40° C. whereby there was obtained the 6-demethyltetracycline-aluminum-CHEPA complex.

EXAMPLE 5

*6-Demethyltetracycline-Aluminum-CHEPA (1:1:2)*

In 250 ml. of distilled water was suspended 26.0 g. of CHEPA and 10.2 g. of aluminum isopropoxide and the suspension was placed in a mechanical shaker at room temperature overnight. The resulting solution was filtered to remove all traces of insoluble material. To the filtrate was added 21.5 g. of 6-demethyltetracycline and this was stirred for 30 minutes until an essentially clear solution was obtained. The pH of this solution was adjusted to 5.0 with concentrated sodium hydroxide solution prior to filtering and lyophilization. The product was dried overnight in vacuo at 40° C. whereby there was obtained the 6-demethyltetracycline-aluminum-CHEPA complex.

EXAMPLE 6

*7-Chloro-6-Demethyltetracycline-Aluminum-CHEPA (1:4:6.6)*

In 20 ml. of the aluminum-CHEPA complex solution prepared according to Example 1 was suspended 1.0 g. of 7-chloro-6-demethyltetracycline hydrochloride, and the suspension was stirred until clear. The pH of this solution was adjusted to 5.0 with concentrated sodium hydroxide solution prior to filtering and lyophilization. The product was dried overnight in vacuo at 40° C. whereby there was obtained the 7-chloro-6-demethyltetracycline-aluminum-CHEPA complex.

EXAMPLE 7

*7-Chloro-6-Demethyltetracycline-Aluminum-CHEPA (1:2:5)*

In 400 ml. of distilled water was suspended 65.0 g. of CHEPA and 20.4 g. of aluminum isopropoxide and the suspension was placed in a mechanical shaker at room temperature overnight. The resulting solution was filtered to remove all traces of insoluble material. To the filtrate was added 23.3 g. of 7-chloro-6-demethyltetracycline and this was stirred for 30 minutes until an essentially clear solution was obtained. The pH of this solution was adjusted to 5.0 with concentrated sodium hydroxide solution prior to filtering and lyophilization. The product was dried overnight in vacuo at 40° C. whereby there was obtained the 7-chloro-6-demethyltetracycline-aluminum-CHEPA complex.

EXAMPLE 8

*6-Deoxytetracycline-Aluminum-CHEPA (1:4:6.6)*

In 25 ml. of distilled water was suspended 3.75 g. of CHEPA and 1.8 g. of aluminum isopropoxide and the suspension was placed in a mechanical shaker at room temperature overnight. The resulting solution was filtered to remove all traces of insoluble material. To the filtrate was added 1.0 g. of 6-deoxytetracycline and this was stirred for 30 minutes until an essentially clear solution resulted. The pH of this solution was adjusted to 5.0 with concentrated sodium hydroxide solution prior to filtering and lyophilization. The product was dried overnight in vacuo at 40° C. whereby there was obtained the 6-deoxytetracycline-aluminum-CHEPA complex.

EXAMPLE 9

*6-Deoxy-6-Demethyltetracycline-Aluminum-CHEPA (1:4:6.6)*

In 20 ml. of the aluminum-CHEPA complex solution prepared according to Example 1 was suspended 1.0 g. of 6-deoxy-6-demethyltetracycline, and the suspension was stirred until clear. The pH of this solution was adjusted to 5.0 with concentrated sodium hydroxide solution. This solution was then filtered and lyophilized. The product was dried overnight in vacuo at 40° C. whereby there was obtained the 6-deoxy-6-demethyltetracycline-aluminum-CHEPA complex.

EXAMPLE 10

*Tetracycline-Aluminum-Calcium-CHEPA (1:4:0.5:12)*

In 35 ml. of the aluminum-CHEPA complex solution prepared according to Example 1 were suspended 0.06 g. (0.001 mole) of calcium oxide and 1.0 g. (0.002 mole) of tetracycline. The suspension was stirred at room temperature for one hour until clear. The pH of the resulting solution was raised to 5.0 with 10% sodium hydroxide solution, and this solution was then lyophilized. The product was dried overnight in vacuo at 40° C. whereby there was obtained the tetracycline-aluminum-calcium-CHEPA complex.

The above procedure was repeated but employing 0.002, 0.003, 0.004, and 0.006 moles of calcium oxide whereby there were obtained the tetracycline-aluminum-calcium-CHEPA complexes containing 1, 1.5, 2, and 3 molar parts of calcium, respectively.

EXAMPLE 11

*6-Demethyltetracycline - Aluminum - Calcium - CHEPA (1:3:1:6)*

In 50 ml. of distilled water was suspended 7.8 g. of CHEPA and 3.06 g. of aluminum isopropoxide and the suspension was placed in a mechanical shaker at room temperature overnight. The resulting solution was filtered to remove all traces of insoluble material. To the filtrate was added 2.15 g. of 6-demethyltetracycline and 0.3 g. of calcium oxide and this was stirred for 30 minutes until an essenially clear solution was obtained. This solution was filtered and the filtrate poured into one liter of isopropanol. The resulting precipitate was removed by filtration and dried overnight in vacuo at 40° C. whereby there was obtained the 6-demethyltetracycline-aluminum-calcium-CHEPA complex.

EXAMPLE 12

*7-Chloro-6-Demethyltetracycline - Aluminum - Calcium-CHEPA (1:4:2:12)*

In 300 ml. of distilled water was suspended 62.4 g. of CHEPA and 16.3 g. of aluminum isopropoxide and the suspension was placed in a mechanical shaker at room temperature overnight. The resulting solution was filtered to remove all traces of insoluble material. To the filtrate was added 9.3 g. of 7-chloro-6-demethyltetracycline and 2.24 g. of calcium oxide and this was stirred for 30 minutes until an essentially clear solution was obtained. This solution was filtered and the filtrate poured into three liters of isopropanol. The resulting precipitate was removed by filtration and dried overnight in vacuo at 40° C. whereby there was obtained the 7-chloro-6-dimethyltetracycline-aluminum-calcium-CHEPA complex.

EXAMPLE 13

This example illustrates the enhanced alkaline stability of the tetracycline-aluminum-calcium-CHEPA complexes as compared with simple tetracycline salts.

Using the method of McCormick et al., J.A.C.S. 79, 2849 (1957), tetracycline-aluminum - calcium - CHEPA complexes containing varying amounts of calcium were evaluated as to their chemical stability under alkaline conditions. The method consists of adding the compounds to be tested to 0.1 N sodium hydroxide so that the resulting solution contains 1500γ/ml. of tetracycline. At frequent time intervals samples of solution were withdrawn and diluted. The absorbance at 355 millimicrons was observed in a spectrophotometer and plotted as a function of time. The time at which one-half of the initial absorbance at 355 millimicrons is retained, known as the half-life, is computed as an index of chemical stability under alkaline conditions. The following table sets forth the half-life values thus obtained for tetracycline hydrochloride and various tetracycline - aluminum - calcium-CHEPA complexes.

TABLE I

| Compound tested | Half-Life (in 0.1 N NaOH) | |
|---|---|---|
| | At 25° C. (in hours) | At 100° C. (in mins.) |
| Tetracycline hydrochloride | 30–34 | 6–8 |
| Tetracycline-Al-Ca-CHEPA (molar ratio 1:4:0.5:12) | 110 | 18 |
| Tetracycline-Al-Ca-CHEPA (molar ratio 1:4:1:12) | 300 | 34 |
| Tetracycline-Al-Ca-CHEPA (molar ratio 1:4:1.5:12) | 360 | 47 |
| Tetracycline-Al-Ca-CHEPA (molar ratio 1:4:2:12) | 440 | 66 |

This application is a continuation-in-part of our co-pending application Serial No. 112,522, filed May 25, 1961, now abandoned.

What is claimed is:

1. A complex comprising a tetracycline antibiotic of the group consisting of tetracycline, 7-chlorotetracycline, 5-hydroxytetracycline, 6-demethyltetracycline, 7-chloro-6-demthyltetracycline, 6 - deoxytetracycline, 6 - demethyl-6-deoxytetracycline, 7 - bromo - 6 - demethyl - 6 - deoxytetracycline, 7 - chloro - 6 - demethyl - 6 - deoxytetracycline, 7 - bromo - 6 - deoxytetracycline, 7 - chloro-6-deoxytetracycline, 7-chloro - 5 - hydroxy - 6 - deoxytetracycline, 7 - bromo - 5 - hydroxy - 6 - deoxytetracycline, and 5-hydroxy - 6 - deoxytetracycline, and the nontoxic acid-addition salts thereof, aluminum, and bis-(1-carboxy-1-hydroxyethyl)-phosphinic acid; said components being present in the molar ratio of antibiotic to aluminum to acid of not less than 1:1:1 and not greater than 1:4:12.

2. A calcium complex of the composition defined in claim 1, said calcium being present in the molar ratio of antibiotic to calcium of not less than 1:0.1 and not greater than 1:3.

3. The complex tetracycline-aluminum-bis-(1-carboxy-1-hydroxyethyl) phosphinic acid, said components being present in the molar ratio of antibiotic to aluminum to acid of not less than 1:4:6.6 and not greater than 1:4:12.

4. The complex 7-chlorotetracycline-aluminum-bis-(1-carboxy-1-hydroxyethyl) phosphinic acid, said components being present in the molar ratio of antibiotic to aluminum to acid of 1:4:6.6.

5. The complex 6-demethyltetracycline-aluminum-bis-(1-carboxy-1-hydroxyethyl) phosphinic acid, said components being present in the molar ratio of not less than 1:1:2 and not greater than 1:4:6.6.

6. The complex 7-chloro-6-demethyltetracycline-aluminum-bis(1-carboxy-1-hydroxyethyl) phosphinic acid, said components being present in the molar ratio of antibiotic to aluminum to acid of not less than 1:2:5 and not greater than 1:4:12.

7. The complex 6-deoxytetracycline-aluminum-bis-(1-carboxy-1-hydroxyethyl) phosphinic acid, said components being present in the molar ratio of antibiotic to aluminum to acid of 1:4:6.6.

8. The complex 6-deoxy-6-demethyltetracycline-aluminum-bis-(1-carobxy-1-hydroxyethyl) phosphinic acid, said components being present in the molar ratio of antibiotic to aluminum of 1:4:6.6.

9. A calcium complex of tetracycline-aluminum-bis-(1-carboxy-1-hydroxyethyl) phosphinic acid as defined in claim 3; said calcium being present in the molar ratio of antibiotic to calcium of not less than 1:0.5 and not greater than 1:2.

10. A calcium complex of 7-chlorotetracycline-aluminum-bis-(1-carboxy-1-hydroxyethyl) phosphinic acid as defined in claim 4; said calcium being present in the molar ratio of antibiotic to calcium of not less than 1:0.5 and not greater than 1:2.

11. A calcium complex of 6-demethyltetracycline-aluminum-bis-(1-carboxy-1-hydroxyethyl) phosphinic acid as defined in claim 5; said calcium being present in the molar ratio of antibiotic to calcium of not less than 1:0.5 and not greater than 1:2.

12. A calcium complex of 7-chloro-6-demethyltetracycline - aluminum - bis - (1 - carboxy - 1 - hydroxyethyl) phosphinic acid as defined in claim 6; said calcium being present in the molar ratio of antibiotic to calcium of not less than 1:0.5 and not greater than 1:2.

13. A calcium complex of 6-deoxytetracycline-aluminum-bis-(1-carboxy-1-hydroxyethyl) phosphinic acid as defined in claim 7; said calcium being present in the molar ratio of antibiotic to calcium of not less than 1:0.5 and not greater than 1:2.

14. A calcium complex of 6-deoxy-6-demethyltetracycline - aluminum - bis - (1 - carboxy - 1 - hydroxyethyl) phosphinic acid as defined in claim 8; said calcium being present in the molar ratio of antibiotic to calcium of not less than 1:0.5 and not greater than 1:2.

References Cited in the file of this patent
UNITED STATES PATENTS
2,736,725    Ritter _____ Feb. 28, 1956

OTHER REFERENCES

Australian Abstract, 62,152/60, open to public inspection January 12, 1961.